United States Patent [19]

Riester et al.

[11] 4,266,883

[45] May 12, 1981

[54] WINDSHIELD WIPER LINKAGE

[75] Inventors: William C. Riester, Williamsville; Dionysios D. Papadatos, Kenmore, both of N.Y.

[73] Assignee: Trico Products Corporation, Buffalo, N.Y.

[21] Appl. No.: 30,113

[22] Filed: Apr. 16, 1979

[51] Int. Cl.³ .......................... F16C 11/00; F16C 11/06
[52] U.S. Cl. ....................................... 403/134; 403/36; 403/76; 403/122
[58] Field of Search ..................... 403/36, 39, 76, 122, 403/133, 134, 135

[56] References Cited

U.S. PATENT DOCUMENTS

| | | | |
|---|---|---|---|
| 3,389,925 | 6/1968 | Gottschald | 403/36 |
| 3,749,431 | 7/1973 | Schmid et al. | 403/76 |
| 3,853,414 | 12/1974 | Hirano et al. | 403/122 X |
| 3,861,812 | 1/1975 | Ito | 403/71 |

*Primary Examiner*—James Kee Chi
*Attorney, Agent, or Firm*—E. Herbert Liss

[57] ABSTRACT

A ball socket member open at one end is formed of yieldable semi-rigid plastic material, with external ears and internal axially extending lubrication distribution and relief slots positioned in alignment with the ears. The slots terminate at the open edge, the lubricant being retained by a closed cell seal of cellular material. An external circumferential groove receives the periphery of an opening in a linkage member, the external ears being received in key slots in the opening. The periphery of the opening is deformed out of the plane of the surface of the linkage to produce an effective thickness approximately the thickness of the groove, providing a method and construction to assure a secure fit in cases where the thickness of the linkage material is either greater than or less than the width of the groove.

4 Claims, 5 Drawing Figures

WINDSHIELD WIPER LINKAGE

BACKGROUND OF THE INVENTION

The present invention relates to a ball joint assembly, and more particularly, to a ball joint assembly utilizing a one piece semi-rigid, plastic socket member for use in connecting a windshield wiper transmission linkage for motor vehicles where substantial pivotal and canting movement occurs.

Ball socket members of plastic material are known in the prior art. Examples of such ball socket members for a windshield wiper transmission linkages are disclosed in U.S. Pat. Nos. 3,749,431, 3,845,998 and 3,853,414. In these known ball socket bushings either no seal is provided for retaining lubricant and preventing entrance of contaminants or a lip type seal integral with the ball socket is provided to effect a seal by engaging against a portion of the ball stud. In these prior art bushings, to effect a good sealing engagement the bushing must be formed of yieldable elastomer, as for example, polyurathane. Due to the severe multi-directional forces applied in a windshield wiper linkage a highly yieldable bushing results in excessive movement at the joints. Such excessive movement can produce distortion of the normal wiping pattern and cause the blade to overrun the molding about the windshield. It is therefore advantageous that a strong, rigid socket member be utilized. Since a multiplicity of linkage members and joints are used in these linkages it is advantageous for economy purposes to utilize a socket member of one size and design for the entire linkage system. This presents a problem because of design and cost considerations. Metals of different thicknesses in the various linkage members are employed depending upon space and design requirements. The socket members may be pre-lubricated. Use of a semi-rigid material in known socket members can cause fracturing during assembly due to pressure created by the entrapment of excess grease.

SUMMARY OF THE INVENTION

It is an object of this invention to provide a novel, improved one piece ball and socket joint which overcomes the aforementioned difficulties and produces advantageous features such as rigidity, strength, resistance to fracture and relief of pressure due to entrapment of lubricant during assembly.

Another object of the invention is to provide an improved ball and socket member which will fit securely on linkage members of various thicknesses.

A still further object is to provide a sealing arrangement to prevent entry of water, dirt and other contaminants to the interior of the ball socket member and to retain the lubricant.

Other objects and advantages of the invention will be apparent from the following detailed description taken in connection with the accompanying drawings.

DETAILED DESCRIPTION

Figure 1:
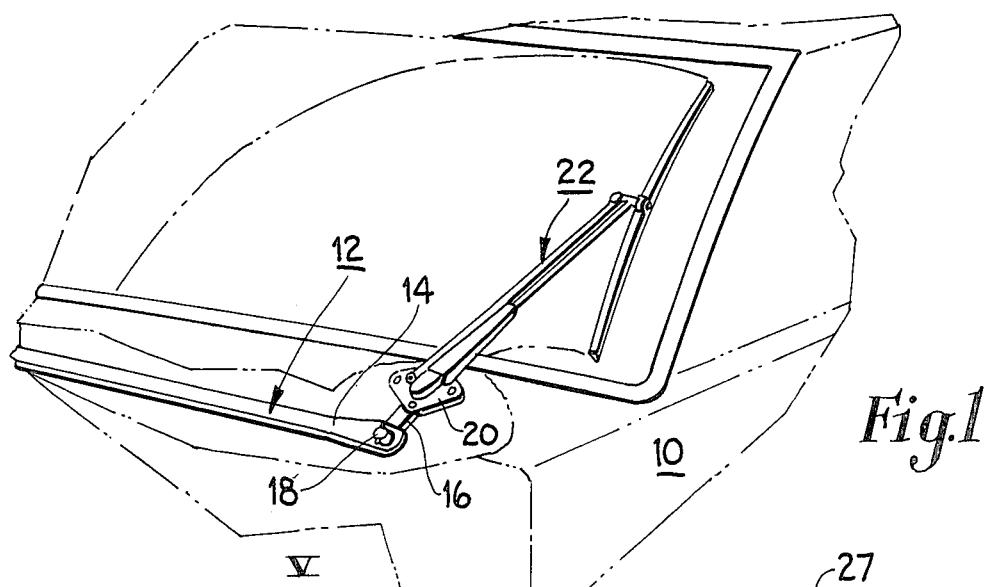
FIG. 1 is a partial perspective view of a motor vehicle showing a windshield wiper which incorporates the present invention.

Referring to the drawings in particular, FIG. 1 illustrates a motor vehicle 10 having a windshield wiper linkage transmission 12 including a connecting arm or first linkage member 14, a crank arm or second linkage member 16 and a ball joint 18 connecting the crank arm 16 and the connecting arm 14. A motor (not shown) drives the connecting arm 14 to oscillate a pivot shaft (not shown) mounted in a pivot body 20. A wiper arm and blade assembly 22 is secured to the pivot shaft for oscillation therewith.

Figure 2:
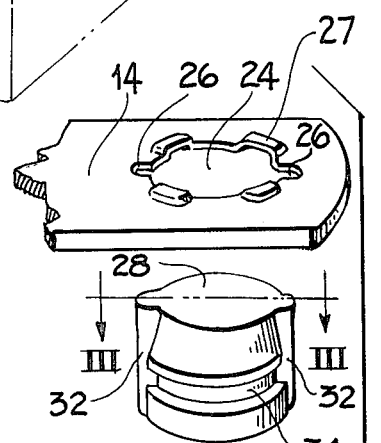
FIG. 2 is an exploded perspective view of a transmission linkage joint assembly of this invention.
Figures 3, 4:
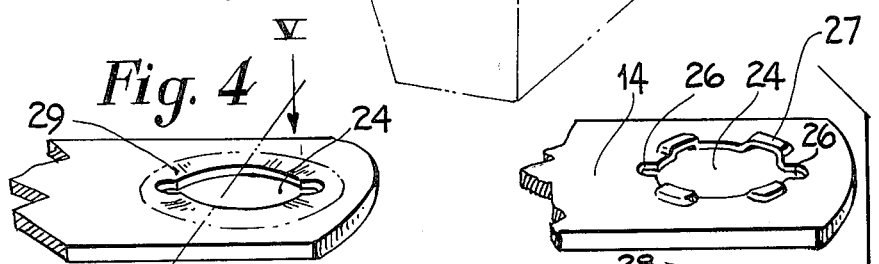
FIG. 3 is a cross sectional view taken on line III—III of FIG. 2 showing the joint assembly in assembled condition.
FIG. 4 illustrates a modified form of a linkage aperture in perspective.
Figure 5:
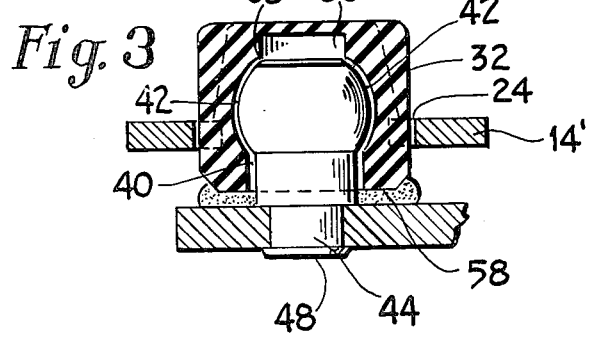
FIG. 5 is a sectional view taken on line V—V of FIG. 4.

In FIGS. 2 and 3 the components of the ball joint assembly 18 are illustrated. In FIG. 2 a linkage member 14 is shown having an aperture 24 adjacent its ends with radially extending key slots 26 diametrically spaced from each other. On the periphery of the aperture 24 are formed circumferentially spaced deformations 27 for a purpose to be hereinafter described. A ball socket member 28 is shown for reception in the aperture 24 as shown in FIG. 3. The ball socket member is of semi-rigid plastic material having a stress level which renders it yieldable to the pressure applied during insertion into the aperture 24; it is also yieldable to the forces applied during insertion of the ball stem member. However, the stress level is resistant to yielding from canting forces applied during operation of the wiper system. ZYTEL(R) ST 801 nylon resin manufactured by E. I. Dupont de Nemours & Co., Inc. and VALOX(R) 310 thermoplastic polyester manufactured by General Electric Co. are examples of materials having such characteristics. In accordance with the broader aspects of the invention other and different materials exhibiting similar properties as described may be employed.

The ball socket member 28 may include external ears 33 diametrically spaced from each other and positioned to interrupt a circumferential external groove 34 which interengages the periphery of the aperture 24 to retain the ball socket on the first linkage member 14. The deformations 27 are provided to approximate the width of groove 34 so that a secure, tight fit is achieved. The linkage member 14' shown in FIG. 3 does not require the deformations 27 since it is of a thickness substantially equal to the width of the groove 34. In the FIG. 4 embodiment the periphery of the aperture 24 is dished as at 29 to accomodate the groove 34 securely when the thickness of the linkage member 14 is greater than the width of the groove 34.

The ball socket 28 has an internal cylindrical recess 36, closed at one end, forming a lubricant socket; it terminates at its other end in a substantially spherical hollow portion 38 which in turn terminates in an open ended cylindrical portion 40 of smaller diameter than the diameter of the spherical portion 38. A pair of internal slots 42 in alignment with the ears 32 extend from the open end of the cylindrical recess 36 to the open end of the cylindrical recess 40 and serve as lubricant relief slots as well as lubricant distribution means. Location of the slots 42 in alignment with ears 32 permits the slots to be of an effective depth while maintaining the notched impact strength; this arrangement enhances resistance to fracturing during assembly and operation.

The second linkage member 16 has secured at an end thereof a ball stem or stud 30 comprising a cylindrical end portion 44 received in aperture 46 and peened over as at 48. The ball stem 30 includes a substantially spherical head 50 corresponding in size and shape to the spherical hollow portion 38 of the ball socket 28; it terminates in a cylindrical ball portion 52 corresponding to the cylindrical recess 36 and is of greater diameter than the stem 44 forming a shoulder 54 therebetween which seats on the periphery of the aperture 46. A seal 56 is provided which may be of polyurethane or any other suitable or desirable closed cell cellular material. The seal 56 encircles the base portion 52 and is retained by the ball 50.

A novel method of securing the ball socket 28 to the first linkage 14 comprises the steps of forming an aperture in the linkage member 14 and deforming the aperture as at 27 or 29 to obtain an effective thickness on the periphery of the aperture approximating the width of the groove 34 of the ball socket 28. Thereafter the ball socket 28 is passed into the aperture 24 with the ears 32 in alignment with the key slots 26 and pressure is applied until the groove 34 engages the periphery of the aperture 24 whereupon it is securely retained in position. The ears 32 interrupt the groove 34 so as to serve as keys for retaining the ball socket against rotation and also to reinforce the axially slotted portion. The link 16 with the ball stem or stud 30 and the seal 56 attached is inserted through cylindrical opening 40 and pressure is applied until the cylindrical portion 50 of the ball 30 snaps into the spherical hollow portion 38 of the ball socket 28. Sufficient pressure is applied to cause yielding of the ball socket member 28 so as to permit entry of the ball stud into the spherical socket. The axial slots 42 form a relief path for expulsion of excessive grease which would otherwise be entrapped and thus be likely to cause fracturing of the socket member body. The stresses resulting are below the threshold at which the ball socket is likely to fracture. When the ball stem 30 is seated in the socket member 28 the periphery 58 of the open end of the ball socket 28 will seat on the seal 56 compressing it slightly. While driving the ball stud 30 into the hollow of the ball socket 28 any excess lubricant within the ball socket will be expelled through the slots 42 and absorbed by the seal 56. Compressing the seal 56 serves to obviate the entry of contaminants into the hollow. The urethane seal 56 being resilient permits canting of the linkage members relative to each other.

In cases where the groove 34 is of smaller width than the thickness of the linkage, as shown in FIG. 4, a peripheral depression or dished periphery is formed having a greater diameter than the diameter of the upper shoulder of the slot 34 resulting in a peripheral edge of a width approximately the width of the groove 34 thereby effecting a secure, tight fit of the ball socket 28 in the aperture 24. If the thickness of the linkage is equivalent to the thickness of the groove 34 the peripheral forming operation may be deleted.

A transmission linkage assembly incorporating a unique ball and socket joint with an improved one piece semi-rigid, fracture resistant ball socket member has been shown for the purposes of illustration. A unique seal has been shown and described. A method of assembly which permits use of a one shape and size ball socket for linkage members of varying thicknesses has been shown and described for the purposes of illustration. It will, of course, be understood, however, that other methods of assembly and details of construction may be utilized in accordance with the broader aspects of the invention and that the peripheral deformation about the aperture and linkage may be varied in shape and size. Therefore, although certain specific embodiments of the invention have been shown and described for the purpose of illustration it will of course be understood that other embodiments and modifications which come within the scope of the invention may be employed.

What is claimed is:

1. In a transmission linkage assembly for windshield wiper systems including a first linkage member having an aperture including one or more radially extending key slots therethrough, a one piece socket member comprising an internal hollow spherical portion, terminating in an open ended cylindrical portion the socket member being engaged in said aperture, said socket member having one or more external ears positioned to engage said key slots for retaining said socket member against rotation and a second linkage member having a substantially spherical ball terminating in a cylindrical stem affixed thereto and received in said socket member through the cylindrical end opening characterized in that said socket member is of semi-rigid plastic material having a stress level yieldable without fracturing to the pressure applied during insertion of the ball stem but which will resist yielding to the pressure applied during operation, said socket member includes internal axially extending lubrication distribution and relief slots extending through the edge of the open end and in alignment with said ears and a seal of closed cell, cellular, resilient material is disposed in compression between the periphery of the cylindrical open end of said socket and the surface of said second linkage member circumscribing said cylindrical stem.

2. A transmission linkage assembly according to claim 1 wherein said ball socket member includes a circumferential groove on its external surface interrupted by said ears, said groove being interengaged with the periphery of said aperture with said ears lying within said key slots characterized in that the periphery of said aperture in said first linkage member is deformed from the plane of the surface of said first linkage member to approximate the width of said groove whereby the ball socket member is held in secure interengagement with said first linkage member.

3. A transmission linkage assembly according to claim 2 characterized in that the periphery of said aperture in said first linkage member is deformed at circumferentially spaced areas.

4. A transmission linkage assembly according to claim 2 characterized in that the periphery of the aperture in said first linkage member is deformed in a dished configuration, the diameter of the dished configuration being greater than the diameter of the base of the ball socket member.

* * * * *